US012619121B2

(12) United States Patent
Rakowski et al.

(10) Patent No.: US 12,619,121 B2
(45) Date of Patent: May 5, 2026

(54) POWER SPLITTERS INCLUDING A TUNABLE MULTIMODE INTERFERENCE COUPLER

(71) Applicants:GlobalFoundries U.S. Inc., Malta, NY (US); Khalifa University of Science and Technology, Abu Dhabi (AE)

(72) Inventors: Michal Rakowski, Ballston Lake, NY (US); Yusheng Bian, Ballston Lake, NY (US); Roderick A. Augur, Saratoga Springs, NY (US); Ayat M. Taha, Abu Dhabi (AE); Marios Papadovasilakis, Abu Dhabi (AE); Yonas Hadush Gebregiorgis, Abu Dhabi (AE); Jaime Viegas, Abu Dhabi (AE)

(73) Assignees: GlobalFoundries U.S. Inc., Malta, NY (US); Khalifa University of Science and Technology, Abu Dhabi (AE)

( * ) Notice: Subject to any disclaimer, the term of this patent is extended or adjusted under 35 U.S.C. 154(b) by 288 days.

(21) Appl. No.: 18/372,953

(22) Filed: Sep. 26, 2023

(65) Prior Publication Data

US 2025/0102877 A1 Mar. 27, 2025

(51) Int. Cl.
*G02F 1/21* (2006.01)
*G02F 1/01* (2006.01)
*G02F 1/225* (2006.01)

(52) U.S. Cl.
CPC ............ *G02F 1/217* (2021.01); *G02F 1/0147* (2013.01); *G02F 1/2257* (2013.01)

(58) Field of Classification Search
CPC ....... G02F 1/217; G02F 1/0147; G02F 1/2257

USPC .................. 385/1–3, 8, 9, 14, 16, 28, 42, 48
See application file for complete search history.

(56) References Cited

U.S. PATENT DOCUMENTS

| | | | | |
|---|---|---|---|---|
| 6,047,096 | A * | 4/2000 | Augustsson ....... | G02B 6/12007 385/37 |
| 11,815,747 | B1 * | 11/2023 | Rabiei ..................... | G02F 1/225 |
| 2003/0091287 | A1 * | 5/2003 | Lam ....................... | G02F 1/3138 385/140 |
| 2012/0087613 | A1 * | 4/2012 | Rasras .................. | G02F 1/2257 257/E31.124 |
| 2016/0377815 | A1 * | 12/2016 | Ma ........................ | G02B 6/2813 385/14 |
| 2021/0311253 | A1 * | 10/2021 | Bian ...................... | G02B 6/107 |
| 2022/0146748 | A1 * | 5/2022 | Bian .................... | G02B 6/1228 |

(Continued)

OTHER PUBLICATIONS

"Wavelength independent multimode interference coupler" by Maese-Novo et al, Optics Express, vol. 21, No. 6, pp. 7033-7040 (Year: 2013).*

(Continued)

*Primary Examiner* — Robert Tavlykaev
(74) *Attorney, Agent, or Firm* — Thompson Hine LLP; Anthony Canale

(57) ABSTRACT

Structures for a power splitter that include a multimode interference coupler and methods of forming such structures. The structure comprises a multimode interference coupler including a grating having a plurality of grating lines, an input waveguide core, and an output waveguide core. The grating lines are disposed between the input waveguide core and the output waveguide core. The structure further comprises a resistive heating element adjacent to the grating lines.

20 Claims, 5 Drawing Sheets

(56)  References Cited

U.S. PATENT DOCUMENTS

2023/0123000 A1* 4/2023 Kamineni .......... G02B 6/12004
385/14
2024/0272511 A1* 8/2024 Suzuki .................... G02B 6/42

OTHER PUBLICATIONS

"Analysis of Periodically Segmented Waveguide Mode Expanders" by Weissman et al, Journal of Lightwave Technology, vol. 13, No. 10, pp. 2053-2058 (Year: 1995).*

"Recent Advances in Silicon Waveguide Devices Using Sub-Wavelength Gratings" by Halir et al, IEEE Journal of Selected Topics in Quantum Electronics, vol. 20, No. 4, paper 8201313 (Year: 2014).*

J. Leuthold and C. W. Joyner, "Multimode Interference Couplers with Tunable Power Splitting Ratios," in Journal of Lightwave Technology, vol. 19, No. 5, pp. 700-707, May 2001, doi: 10.1109/50.923483.

Shi, Yuchen, et al., 2022. "Ultra-Broadband and Low-Loss Silicon-Based Power Splitter Based on Subwavelength Grating-Assisted Multimode Interference Structure" Photonics 9, No. 7: 435. https://doi.org/10.3390/photonics9070435.

Huang, CC., Sun, TC. "Numerical simulations of tunable ultrashort power splitters based on slotted multimode Interference couplers." Scientific Reports 9, 12756 (2019). https://doi.org/10.1038/s41598-019-49186-x.

C. Deng et al., "Broadband TM-Mode-Pass Polarization Rotator and Power Divider With Tunable Beam-Splitting Ratio," in IEEE Photonics Journal, vol. 14, No. 4, pp. 1-4, Aug. 2022, Art No. 6646004, doi: 10.1109/JPHOT.2022.3195491.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

* cited by examiner

POWER SPLITTERS INCLUDING A TUNABLE MULTIMODE INTERFERENCE COUPLER

BACKGROUND

The disclosure relates to photonics chips and, more specifically, to structures for a power splitter that include a multimode interference coupler and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as a laser or an optical fiber.

A power splitter is a photonic component that is commonly used in photonics chips to divide optical power between multiple waveguides with a desired coupling ratio. Conventional power splitters have a fixed power splitting ratio, which prevents designers from compensating for fabrication imperfections and dynamically balancing the interferometer for high-extinction and high signal-to-noise ratio performance.

Improved structures for a power splitter that include a multimode interference coupler and methods of forming such structures are needed.

SUMMARY

In an embodiment of the invention, a structure for a power splitter is provided. The structure comprises a multimode interference coupler including a grating having a plurality of grating lines, an input waveguide core, and an output waveguide core. The grating lines are disposed between the input waveguide core and the output waveguide core. The structure further comprises a resistive heating element adjacent to the grating lines.

In an embodiment of the invention, a method of forming a structure for a power splitter is provided. The method comprises forming a multimode interference coupler including a grating having a plurality of grating lines, an input waveguide core, and an output waveguide core. The grating lines are disposed between the input waveguide core and the output waveguide core. The method further comprises forming a resistive heating element adjacent to the grating lines.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
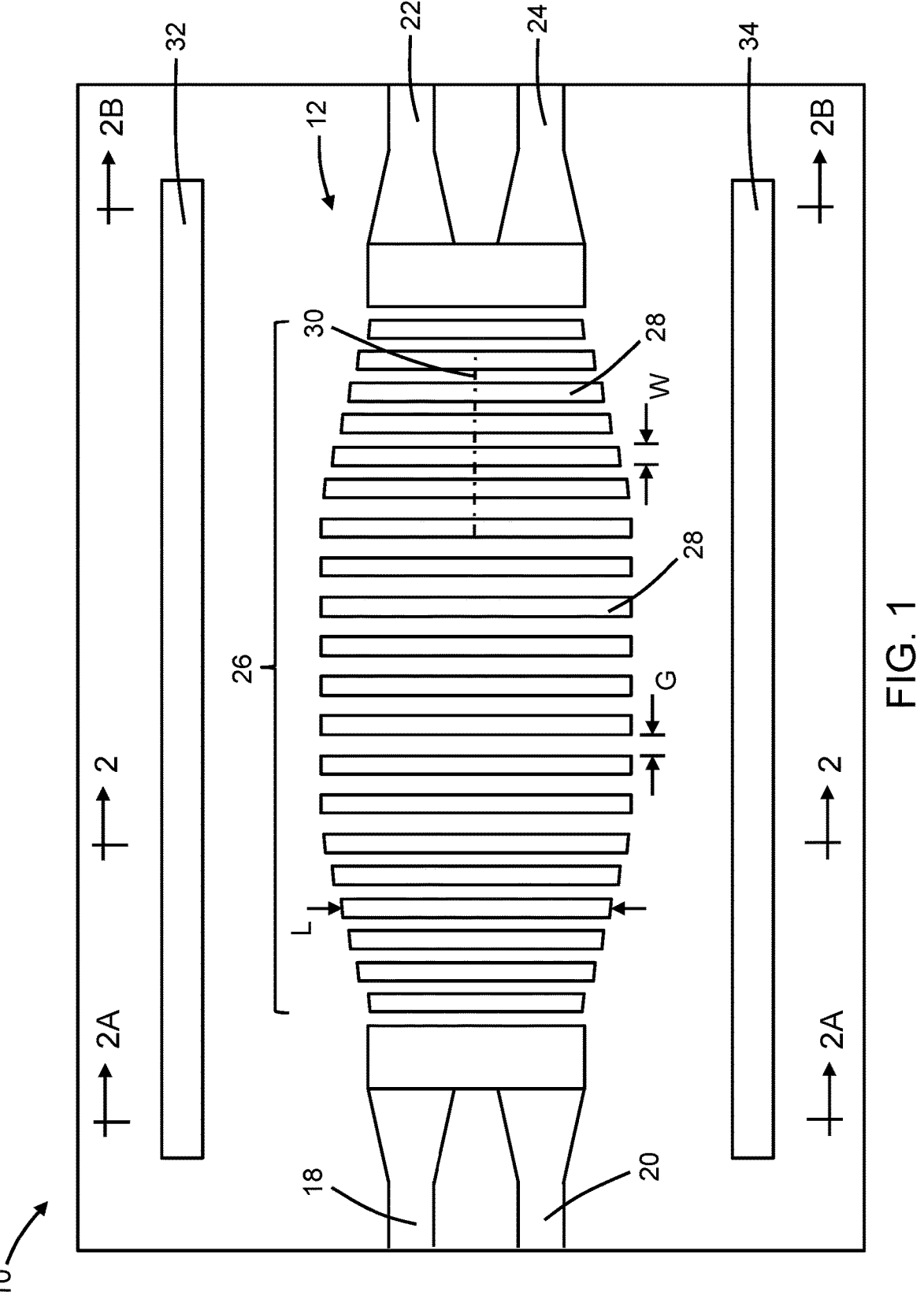
FIG. 1 is a top view of a structure at an initial fabrication stage of a processing method in accordance with embodiments of the invention.
Figure 2:
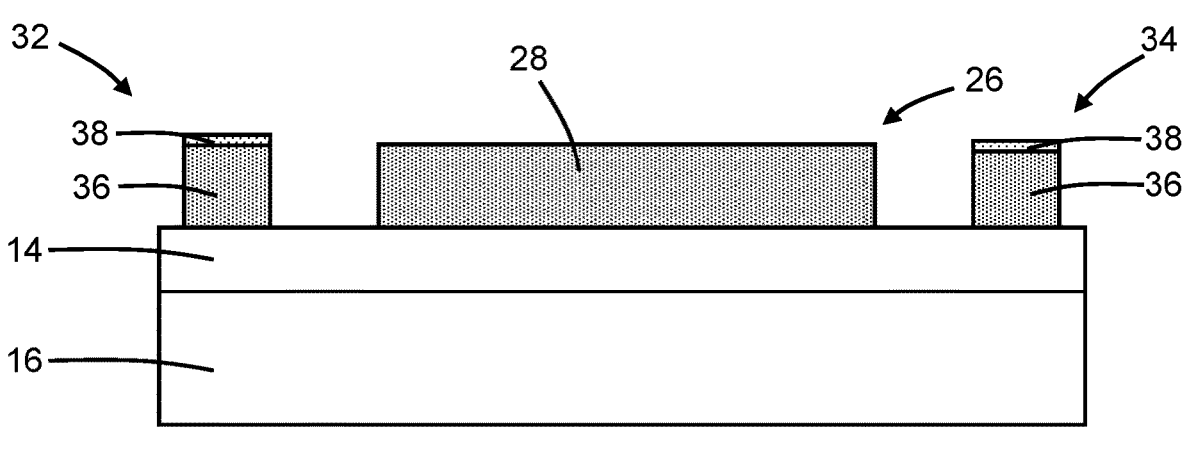
FIG. 2 is a cross-sectional view taken generally along line 2-2 in FIG. 1.
Figure 2A:
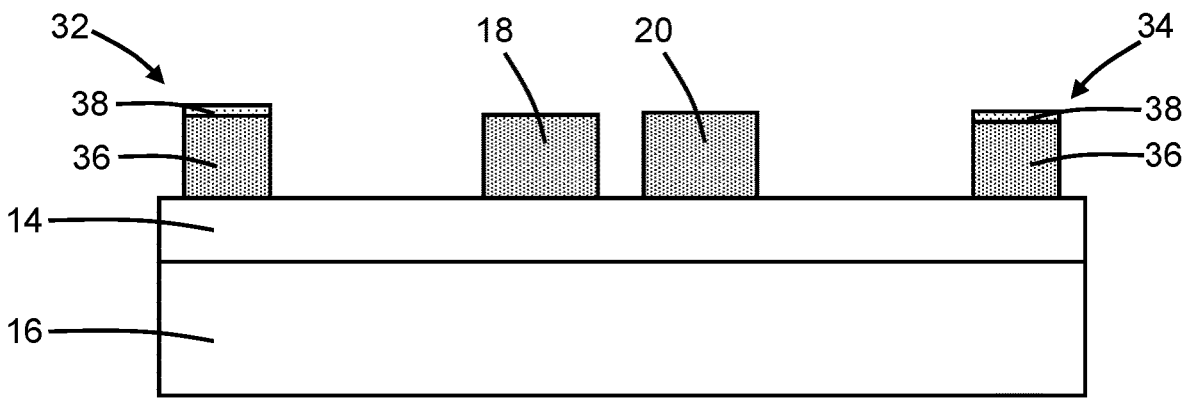
FIG. 2A is a cross-sectional view taken generally along line 2A-2A in FIG. 1.
Figure 2B:
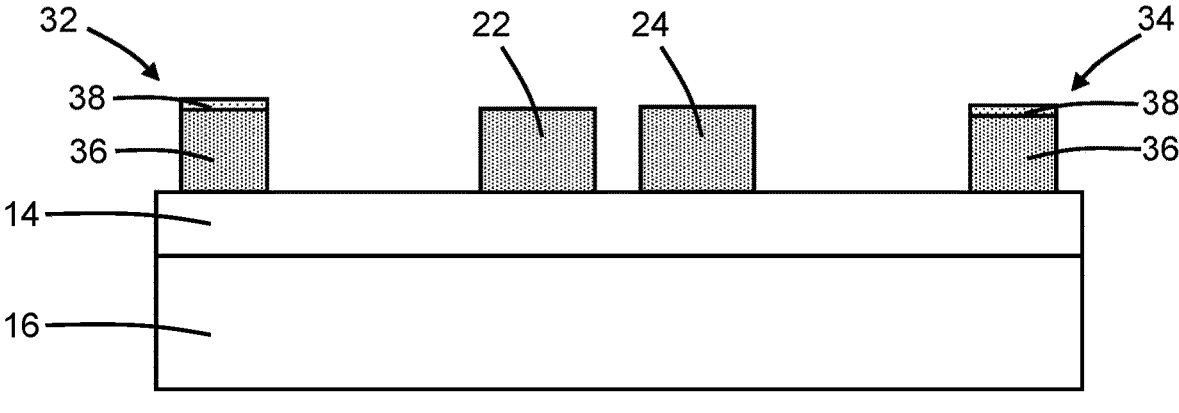
FIG. 2B is a cross-sectional view taken generally along line 2B-2B in FIG. 1.

With reference to FIGS. 1, 2, 2A, 2B and in accordance with embodiments of the invention, a structure 10 for a power splitter includes a multimode interference coupler 12 that is disposed on, and over, a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate. The multimode interference coupler 12 is separated from the substrate 16 by the dielectric material of the intervening dielectric layer 14. In an alternative embodiment, one or more additional dielectric layers comprised of, for example, silicon dioxide may be disposed between the multimode interference coupler 12 and the upper surface of the dielectric layer 14.

In an embodiment, the multimode interference coupler 12 may be comprised of a material having a refractive index that is greater than the refractive index of silicon dioxide. In an embodiment, the multimode interference coupler 12 may be comprised of a semiconductor material, such as single-crystal silicon, amorphous silicon, or polysilicon. In an alternative embodiment, the multimode interference coupler 12 may be comprised of a dielectric material, such as silicon nitride, silicon oxynitride, or aluminum nitride. In alternative embodiments, other materials, such as a III-V compound semiconductor, may be used to form the multimode interference coupler 12.

In an embodiment, the multimode interference coupler 12 may be formed by patterning a layer with lithography and etching processes. In an embodiment, an etch mask may be formed with a lithography process over a layer, and unmasked sections of the layer may be etched and removed with an etching process. In an embodiment, the multimode interference coupler 12 may be formed by patterning the semiconductor material, such as single-crystal silicon, of the device layer of a silicon-on-insulator substrate. In an embodiment, the multimode interference coupler 12 may be formed by patterning a deposited layer comprised of its constituent material, such as polysilicon.

The multimode interference coupler 12 may include an input waveguide core 18, an input waveguide core 20, an output waveguide core 22, an output waveguide core 24, and a grating 26 disposed between the input waveguide cores 18, 20 and the output waveguide cores 22, 24. The grating 26 may have a length given by a distance along a longitudinal axis 30 from the grating line 28 closest to the input waveguide cores 18, 20 to the grating line 28 closest to the output waveguide cores 22, 24. The grating 26 may include multiple grating lines 28 that have a spaced arrangement along the longitudinal axis 30. The grating lines 28 are separated by gaps G, which are open spaces that are disposed along the longitudinal axis 30 between adjacent pairs of the grating lines 28 and that may expose portions of the dielectric layer 14. The grating lines 28 may include a width W in a direction parallel to the longitudinal axis 30 and a length L in a direction transverse to the longitudinal axis 30. In an embodiment, the width W of the grating lines 28 may vary with longitudinal position over the length of the grating 26. The gaps G between the grating lines 28 may have a width dimension in a direction parallel to the longitudinal axis 30. In an embodiment, the width dimension of the gaps G between the grating lines 28 may vary with longitudinal position over the length of the grating 26.

In an embodiment, the period of the grating 26, which may be defined as the sum of the width W of the grating lines 28 and the width dimension of the gaps G, may be constant over the length of the grating 26. In an embodiment, the duty cycle of the grating lines 28 may be apodized or non-uniform to provide the variation in the width W of grating lines 28 and the width dimension of the gaps G varying over the length of the grating 26. The duty cycle, which is dimensionless, may represent a ratio of the solid region included in the grating lines 28 to the entire period.

Figure 3:
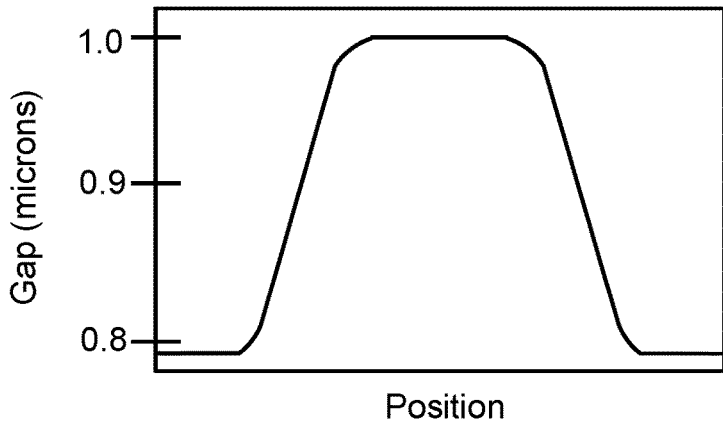
FIG. 3 is a graphical view depicting an exemplary apodized distribution for the gaps between the grating lines in FIG. 1.

In an embodiment, the width dimension of the gaps G may be smallest adjacent to the input waveguide cores 18, 20 and output waveguide cores 22, 24, and largest at the center of the grating 26. In an embodiment, the width dimension of the gaps G may progressively increase from a minimum value adjacent to the input waveguide cores 18, 20 to a maximum value at the center of the grating 26, and the width dimension of the gaps G may progressively increase from a minimum value adjacent to the output waveguide cores 22, 24 to a maximum value at the center of the grating 26. In an embodiment, the duty cycle of the grating lines 28 may vary according to a Gaussian distribution (FIG. 3) in which the width dimension of the gaps G between the grating lines 28 increases slowly adjacent to the input waveguide cores 18, 20, increases more rapidly in a transition region, increases slowly and decreases slowly on opposite sides of the center of the grating 26, decreases more rapidly in a transition region, and then decreases slowly adjacent to output waveguide cores 22, 24. In an exemplary embodiment, the gaps G may range in numerical value from about 0.08 microns to about 0.12 microns. In an embodiment, the duty cycle of the grating lines 28 may be apodized to define an aperiodic arrangement in which the pitch of the grating lines 28 is constant over the length of the grating 26. In an alternative embodiment, the pitch and duty cycle of the grating lines 28 may be uniform to define a periodic arrangement. In an embodiment, the pitch of the grating lines 28, which defines a period of the grating 26, may range in numerical value from about a value of 0.1 times the light wavelength of operation to about 0.3 times the light wavelength of operation. In an embodiment, the duty cycle of the grating lines 28 may range in numerical value from about 0.4 to about 0.7.

The grating lines 28 are disposed inside an envelope defined by the variation in the length L of the grating lines 28 over the length of the grating 26. In an embodiment, the length L of the grating lines 28 may be smallest adjacent to the input waveguide cores 18, 20 and output waveguide cores 22, 24, and largest at the center of the grating 26. In an embodiment, the length L of the grating lines 28 may progressively increase from a minimum value adjacent to the input waveguide cores 18, 20 to a maximum value at the center of the grating 26, and the length L of the grating lines 28 may progressively increase from a minimum value adjacent to the output waveguide cores 22, 24 to a maximum value at the center of the grating 26. In an embodiment, the length L of the grating lines 28 may vary on each side of the center of the grating 26 according to a non-linear function, such as a quadratic function, a cubic function, a parabolic function, a sine function, a cosine function, a Bezier function, or an exponential function. In an embodiment, the length L of the grating lines 28 on each side of the center of the grating 26 may change according to a quadratic function to ensure smooth side edges and reduced scattering. In an embodiment, the grating lines 28 and gaps G characterizing the grating 26 may be dimensioned and positioned at small enough pitch such that the grating 26 is configured to be a subwavelength grating that does not radiate or reflect light at a wavelength of operation, such as a wavelength in a range of 400 nanometers to 3,000 nanometers.

The structure 10 further includes a resistive heating element 32 and a resistive heating element 34 that are positioned adjacent to the grating 26. In that regard, the grating lines 28 are laterally disposed between the resistive heating element 32 and the resistive heating element 34 such that each grating line 28 extends lengthwise between the resistive heating element 32 and the resistive heating element 34. The resistive heating elements 32, 34 collectively define a heater that may be used to vary the temperature of the grating lines 28. The resistive heating elements 32, 34 may be configured to generate heat by Joule heating under the control of a variable electrical signal, and the generated heat may be transferred by conduction from the resistive heating elements 32, 34 to the grating lines 28. In an embodiment, the resistive heating element 32 may extend adjacent to the grating lines 28 over the entire length of the grating 26 and the resistive heating element 34 may also extend adjacent to the grating lines 28 over the entire length of the grating 26.

In an embodiment, each of the resistive heating elements 32, 34 may include a strip 36 comprised of a semiconductor material, such as silicon, and a silicide layer 38 that is formed on the strip 36. In an embodiment, the strips 36 and the grating lines 28 of the grating 26 may be comprised of the same material. In an embodiment, the strips 36 may be characterized as bus waveguide cores that are concurrently formed along with the multimode interference coupler 12 and that extend parallel to the longitudinal axis 30 of the grating 26. The silicide layers 38 may be formed on the strips 36 by a silicidation process that involves one or more annealing steps to form a silicide phase by reacting the semiconductor material of the strips 36 with a layer comprised of a silicide-forming metal, such as nickel, that is deposited on the strips 36. An initial annealing step of the silicidation process may consume all or part of the silicide-forming metal to form the silicide layers 38. Following the initial annealing step, any non-reacted silicide-forming metal may be removed by wet chemical etching. The silicide layers 38 may then be subjected to an additional annealing step at a higher temperature to form a lower-resistance silicide phase.

Figure 4:
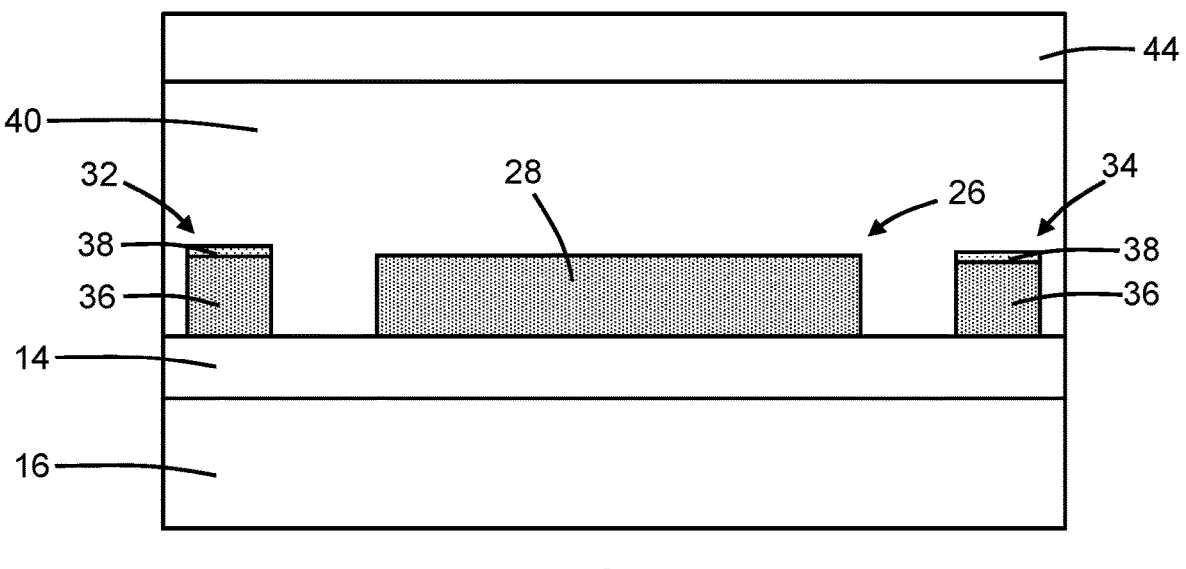
FIGS. 4, 4A, 4B are cross-sectional views at a fabrication stage subsequent to FIGS. 1, 2, 2A, 2B.
Figure 4A:
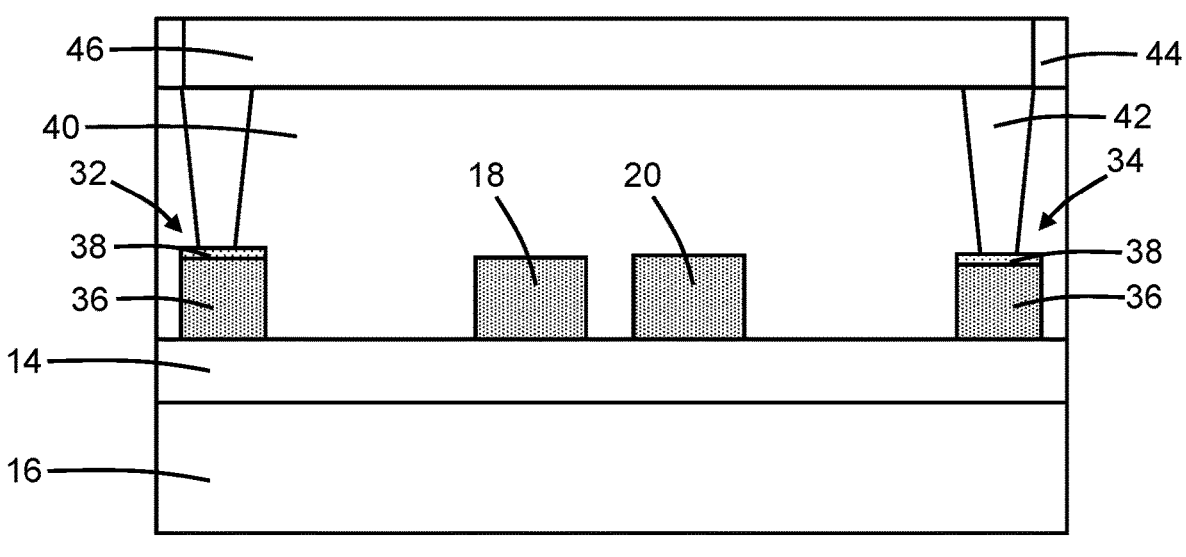
Figure 4B:
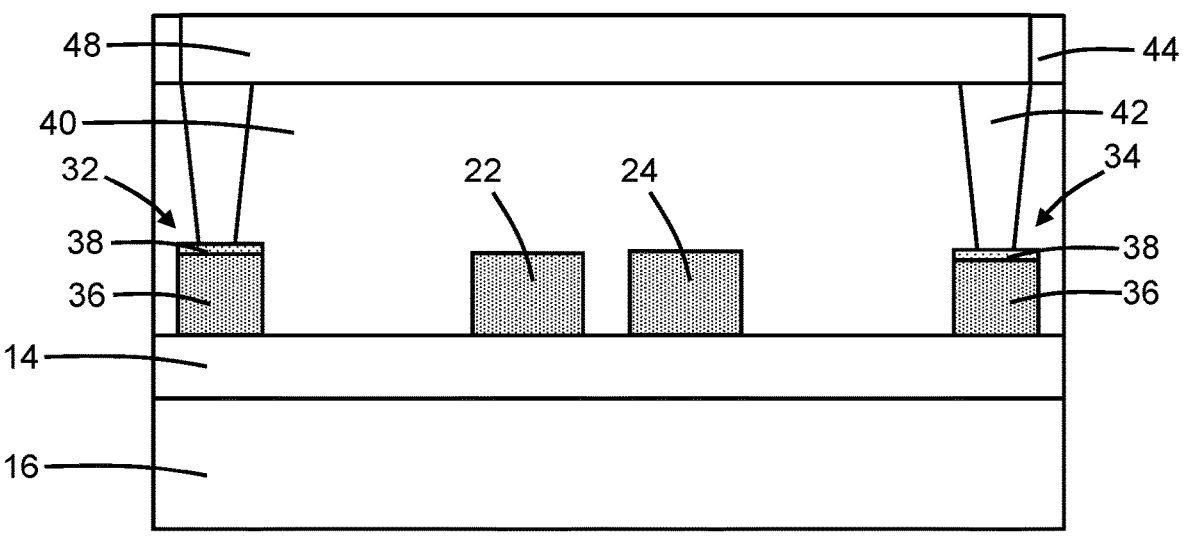

With reference to FIGS. 4, 4A, 4B in which like reference numerals refer to like features in FIGS. 1, 2, 2A, 2B and at a subsequent fabrication stage, a dielectric layer 40 may be formed over the multimode interference coupler 12 and resistive heating elements 32, 34. The dielectric layer 40 may be comprised of a dielectric material, such as silicon dioxide, having a refractive index that is less than the refractive index of the material constituting the multimode interference coupler 12. The dielectric layer 40 may be deposited and then planarized following deposition.

Portions of the dielectric layer 40 fill the gaps G between the grating lines 28 of the grating 26 with dielectric material. The portions of the dielectric material of the dielectric layer 40 inside the gaps G and the grating lines 28 may define a metamaterial structure in which the material constituting the grating lines 28 has a higher refractive index than the dielectric material of the dielectric layer 40. The metamaterial structure can be treated as a homogeneous material having an effective refractive index that is intermediate between the refractive index of the material constituting the grating lines 28 and the refractive index of the dielectric material constituting the dielectric layer 40.

Contacts 42 may be formed in the dielectric layer 40 that are physically and electrically connected to the resistive heating elements 32, 34. The contacts 42 may be comprised of a metal, such as tungsten, that is deposited in openings patterned by lithography and etching processes in the dielectric layer 40. The contacts 42 may connect the resistive heating elements 32, 34 with a power source that can be operated to supply a variable electrical signal that causes Joule heating of the resistive heating elements 32, 34. Portions of the dielectric layer 40 separate the resistive heating elements 32, 34 and contacts 42 from the grating lines 28. In an alternative embodiment, the resistive heating elements 32, 34 may be connected to the grating lines 28 by a thin slab layer of material that has a higher thermal conductivity than the dielectric layer 40 and that provides a path for enhanced heat conduction.

A dielectric layer 44 may be formed over the dielectric layer 40, and interconnects 46, 48 may be formed in the dielectric layer 44. The interconnects 46, 48 may be comprised of a metal, such as copper, that is deposited in openings patterned in the dielectric layer 44. The interconnects 46, 48, which extend as bridges across the multimode interference coupler 12, couple the resistive heating element 32 to the resistive heating element 34. Additional metallization levels (not shown) may be formed over the dielectric layer 44 that couple the interconnect 46 to power and the interconnect 48 to ground.

In use, the multimode interference coupler 12 may receive light from either the input waveguide core 18 or the input waveguide core 20 as input to the structure 10. The resistive heating elements 32, 34 are configured to generate heat by Joule heating under the control of a variable electrical signal from the power supply, and the generated heat is transferred by conduction from the resistive heating elements 32, 34 to the grating lines 28 of the grating 26. The temperature of the grating lines 28 is elevated by the transferred heat. The localized temperature change experienced by the grating lines 28 is effective to change the splitting ratio of the multimode interference coupler 12, which changes the proportionality of the input power that is supplied to the different arms 54, 56 and effectively enables the tunability of the multimode interference coupler 12.

The multimode interference coupler 12 and resistive heating elements 32, 34 of the structure 10 cooperate to provide a tunable power splitter. The tunable power splitter may be characterized by a compact footprint in comparison to conventional power splitters. The splitting ratio may be thermally tunable using the resistive heating elements 32, 34 with a low power consumption. The tunable power splitter may exhibit a low insertion loss and may maximize the total transmission spectrum.

Figure 5:
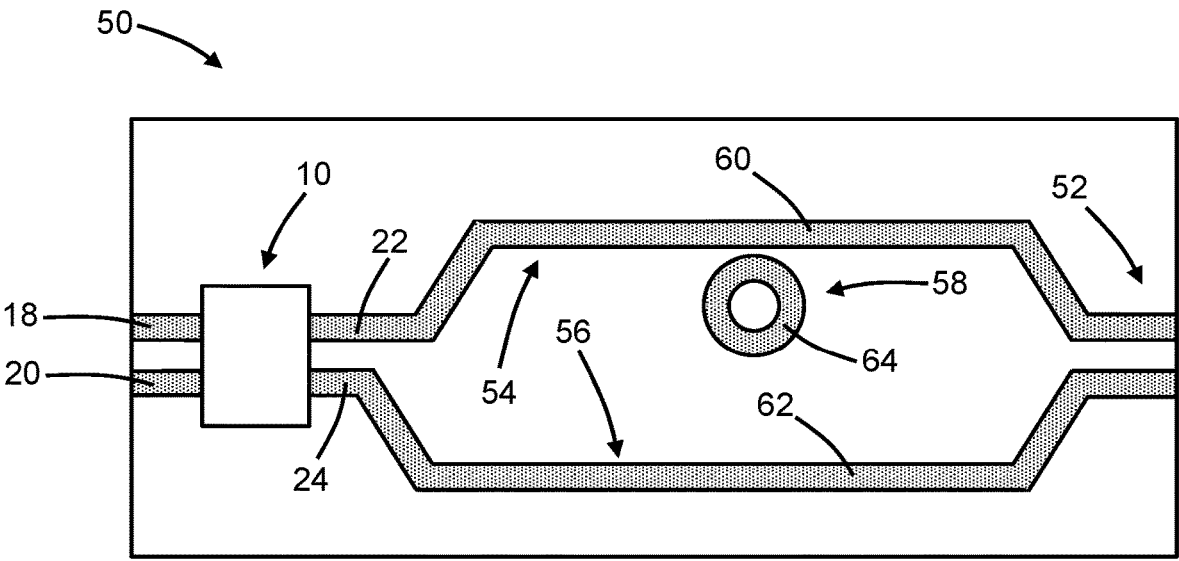
FIG. 5 is a top view of a structure in accordance with alternative embodiments of the invention.

With reference to FIG. 5 and in accordance with alternative embodiments, a Mach-Zehnder interferometer 50 may include an input optical coupler provided by the multimode interference coupler 12 and resistive heating elements 32, 34 (FIG. 1) of the structure 10, an output optical coupler 52, arms 54, 56 that are separately routed from the input optical coupler to the output optical coupler 52, and a ring resonator 58 that may be disposed adjacent to the arm 54. The input waveguide cores 18, 20 of the multimode interference coupler 12 may define a pair of input ports to the Mach- Zehnder interferometer 50, and the output waveguide cores 22, 24 of the multimode interference coupler 12 may be connected to the arms 54, 56. The output optical coupler 52 may include a pair of output ports from the Mach-Zehnder interferometer 50.

The output optical coupler 52 and arms 54, 56 of the Mach-Zehnder interferometer 50 are formed from waveguide cores 60, 62 that include portions providing the arms 54, 56 and portions providing the output optical coupler 52. The portions of the waveguide cores 60, 62 diverge from the output of the multimode interference coupler 12 to a parallel alignment with a routing that laterally separates the arms 54, 56 to limit crosstalk. In an embodiment, the arms 54, 56 of the Mach-Zehnder interferometer 50 may be unbalanced in that the arm 54 may be shorter than the arm 56. In an alternative embodiment, the arms 54, 56 of the Mach-Zehnder interferometer 50 may be balanced in that the arms 54, 56 may have equal lengths. The output optical coupler 52 of the Mach-Zehnder interferometer 50 may be a directional coupler in which adjacent portions of the waveguide core 60 and the waveguide core 62 are routed with a proximity characterized by a separation that supports light transfer. In an embodiment, the output optical coupler 52 may be a 50-50 directional coupler.

The ring resonator 58 may be formed from a waveguide core 64 that has a closed geometrical shape. The waveguide core 64 of the ring resonator 58 includes a portion that is disposed adjacent to a portion of the waveguide core 60 in the arm 54 of the Mach-Zehnder interferometer 50. In an embodiment, the adjacent portions of the waveguide core 60 and the waveguide core 64 define a light coupling region. In an embodiment, the ring resonator 58 may be configured with a ring shape. In an alternative embodiment, the ring resonator 58 may be configured with an oblong or racetrack shape. In an alternative embodiment, the ring resonator 58 may be omitted from the Mach-Zehnder interferometer 50.

The utilization of the structure 10 as a tunable input optical coupler may operate to significantly increase the extinction ratio of the Mach-Zehnder interferometer 50 compared to a conventional Mach-Zehnder interferometer that lacks the structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a power splitter, the structure comprising:
a multimode interference coupler including a grating having a plurality of grating lines, a first input waveguide core, and a first output waveguide core, the grating lines disposed between the first input waveguide core and the first output waveguide core; and
a first resistive heating element adjacent to the grating lines,
wherein the grating lines have a first duty cycle that decreases with a first variable rate from the first input waveguide core toward a center of the grating, and the grating lines have a second duty cycle that increases with a second variable rate from the center of the grating toward the first output waveguide core.

2. The structure of claim 1 further comprising:
a second resistive heating element adjacent to the grating lines.

3. The structure of claim 2 wherein the grating lines are laterally disposed between the first resistive heating element and the second resistive heating element.

4. The structure of claim 3 wherein the grating has a length given by a distance between the grating lines respectively closest to the first input waveguide core and the first output waveguide core, and the first resistive heating element and the second resistive heating element each extend over an entirety of the length of the grating.

5. The structure of claim 1 wherein the grating includes a longitudinal axis and a plurality of gaps that alternate with the grating lines along the longitudinal axis, and the gaps have a width dimension that varies with position along the longitudinal axis.

6. The structure of claim 5 wherein the grating lines have a width that varies with position along the longitudinal axis.

7. The structure of claim 6 wherein the grating has a length given by a distance between the grating lines respectively closest to the first input waveguide core and the first output waveguide core, the grating has a period given by a sum of the width dimension of the gaps and the width of the grating lines, and the period is constant along the length of the grating.

8. The structure of claim 5 wherein the grating lines have a length in a direction transverse to the longitudinal axis, and the length of the grating lines varies with position along the longitudinal axis.

9. The structure of claim 8 wherein the length of the grating lines varies according to a non-linear function.

10. The structure of claim 9 wherein the non-linear function is a quadratic function.

11. The structure of claim 1 wherein the grating includes a longitudinal axis, the grating lines have a length in a direction transverse to the longitudinal axis, and the length of the grating lines varies with position along the longitudinal axis.

12. The structure of claim 11 wherein the length of the grating lines varies according to a non-linear function.

13. The structure of claim 12 wherein the non-linear function is a quadratic function.

14. The structure of claim 1 wherein the multimode interference coupler includes a second input waveguide core, a second output waveguide core, and the grating lines of the grating are disposed between the second input waveguide core and the second output waveguide core.

15. The structure of claim 14 further comprising:
an optical coupler;
a first arm routed from the first output waveguide core to the optical coupler; and
a second arm routed from the second output waveguide core to the optical coupler.

16. The structure of claim 15 further comprising:
a ring resonator disposed adjacent to the first arm.

17. The structure of claim 1 further comprising:
a first dielectric layer over the multimode interference coupler and the first resistive heating element; and
a contact in the first dielectric layer, the contact coupled to the first resistive heating element.

18. The structure of claim 17 further comprising:
a semiconductor substrate; and
a second dielectric layer on the semiconductor substrate,
wherein the multimode interference coupler and the first resistive heating element overlie the second dielectric layer.

19. The structure of claim 1 wherein the first resistive heating element comprises a strip including a semiconductor material and a silicide layer on the strip.

20. A method of forming a structure for a power splitter, the method comprising:
forming a multimode interference coupler including a grating having a plurality of grating lines, an input waveguide core, and an output waveguide core, wherein the grating lines are disposed between the input waveguide core and the output waveguide core; and
forming a resistive heating element adjacent to the grating lines,
wherein the grating lines have a first duty cycle that decreases with a first variable rate from the input waveguide core toward a center of the grating, and the grating lines have a second duty cycle that increases with a second variable rate from the center of the grating toward the output waveguide core.

\*    \*    \*    \*    \*